United States Patent [19]

Meier et al.

[11] 3,847,199
[45] Nov. 12, 1974

[54] REMOVABLE OVEN DOOR GASKET AND METHOD OF MAKING SAME

[75] Inventors: Ernie A. Meier, Glen Ellyn, Ill.; Alfred M. Micallef, Ann Arbor, Mich.

[73] Assignee: K. & M. Rubber co., Elk Grove, Ill.

[22] Filed: May 29, 1973

[21] Appl. No.: 364,374

Related U.S. Application Data

[62] Division of Ser. No. 217,862, Jan. 14, 1973, Pat. No. 3,765,400.

[52] U.S. Cl. ............................. 156/293, 156/329
[51] Int. Cl. ......................................... B29c 19/00
[58] Field of Search ............... 156/110 A, 293, 329; 161/207, 216, 217, 219; 29/450

[56] References Cited
UNITED STATES PATENTS

| | | | |
|---|---|---|---|
| 3,387,839 | 6/1968 | Miller et al | 161/219 X |
| 3,526,952 | 9/1970 | Place | 29/450 |
| 3,505,099 | 4/1970 | Neuroth | 161/207 X |

OTHER PUBLICATIONS

Kirk–Othmer Encyclopedia of Chemical Technology, 2nd Edition, Vol. 17, p. 632, John Wiley & Sons.

Primary Examiner—Daniel J. Fritsch
Assistant Examiner—Neal Kalishman
Attorney, Agent, or Firm—Silverman & Cass

[57] ABSTRACT

A method of making an oven door gasket for an oven door construction in which the door is adapted to be sealed to a front plane surface when the door is closed. The seal comprises tubular elastomeric gaskets having metal inserts in their ends removably secured to the front plane surface around the oven opening. The inserts having securing formations on their bodies. The inserts are held in place by room temperature vulcanizing adhesive and have structures cooperating with holes in the front plane surface into which the structures are engaged. The gaskets are stretched to make them fit and held in place by tension, while being easily removable to enable the oven front plane surface to be cleaned or the gaskets to be replaced.

The method involves inserting the body portion of each insert into the hollow end of the gasket after applying RTV and vulcanizing the RTV to solid condition to hold the insert in place with its securing formation protruding.

9 Claims, 9 Drawing Figures

PATENTED NOV 12 1974 3,847,199
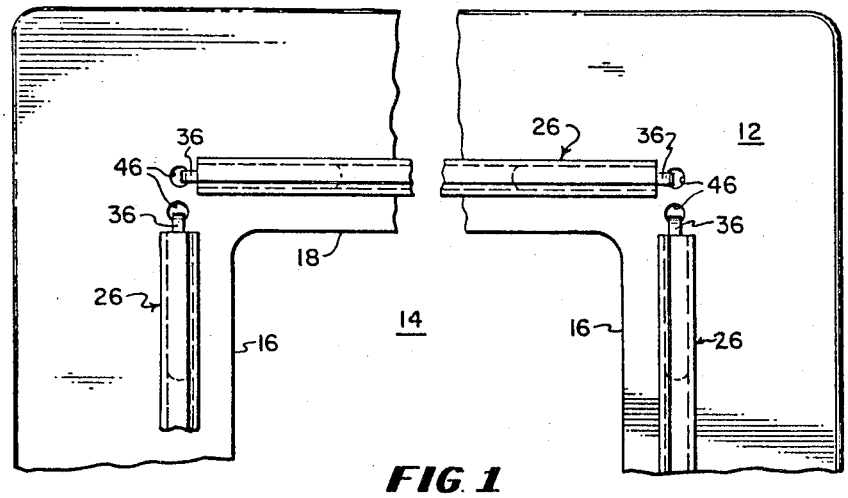
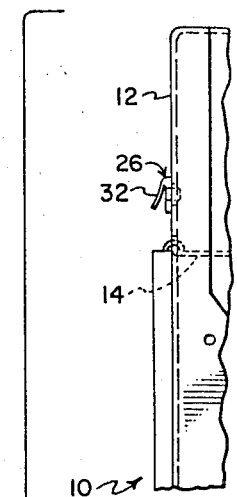
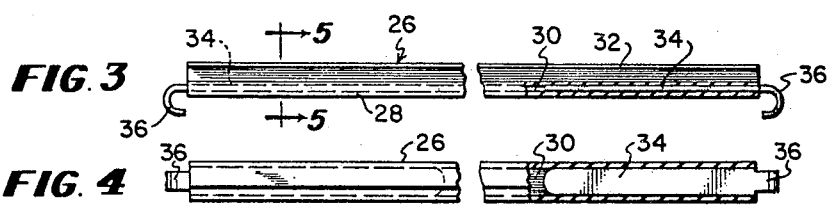
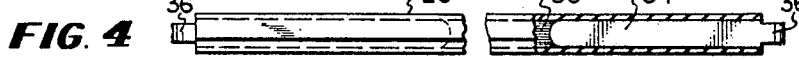
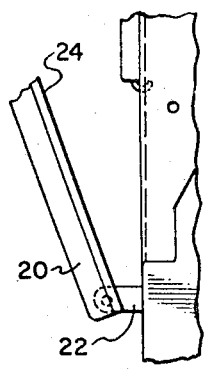
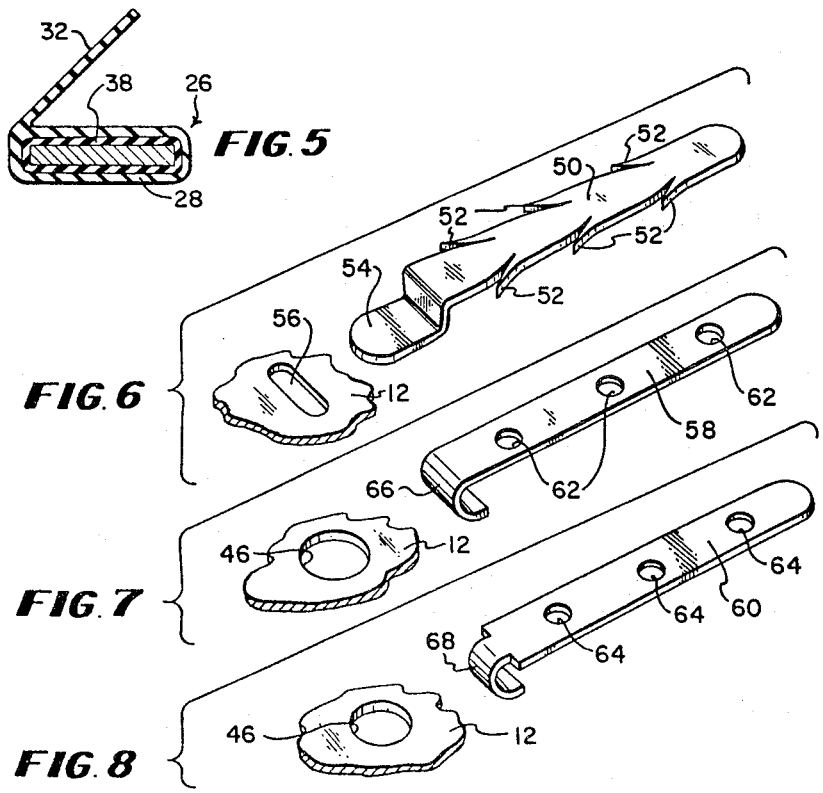
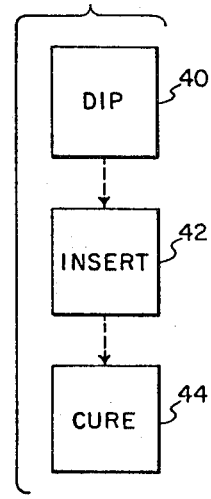

3,847,199

REMOVABLE OVEN DOOR GASKET AND METHOD OF MAKING SAME

CROSS-REFERENCE TO RELATED APPLICATION

This application is a division of a copending application entitled "REMOVABLE OVEN DOOR GASKET," Ser. No. 217,862, filed Jan. 14, 1972, now U.S. Pat. No. 3,765,400, which is incorporated by reference.

BACKGROUND OF THE INVENTION

The invention herein is concerned primarily with the sealing of the doors of domestic cooking ovens and more specifically to methods of making a novel gasket for effecting such sealing disclosed and claimed in said copending application.

The background of the invention is fully set forth in said copending application which is incorporated by reference herein, and which, as described, teaches improvements over U.S. Pat. Nos. 3,029,805 and 3,404,675. Additional prior art comprises U.S. Pat. Nos. 3,439,668 and 3,507,266.

This invention is concerned with novel methods of making the gasket of said copending application.

SUMMARY OF THE INVENTION

The gasket to be made by the method of the invention comprises an elongate strip of elastomeric material which is hollow at least at its ends. A metal insert is engaged in each end of the strip, being held in place by means of a room temperature vulcanizable adhesive. The protruding ends of the metal inserts have a hooklike configuration adapted to be engaged in suitable perforations formed in the front oven wall. There are two perforations for each side of the oven opening and one gasket is intended to be installed between each pair of perforation along each side of the opening.

The gasket is made according to one method by dipping the bodies of the inserts into a container of the room temperature vulcanizing adhesive, inserting the same into the ends of a length of the gasket, and subjecting the resulting assembly to steam for several hours, preferably in an autoclave. This cures the adhesive in moist conditions and forms an excellent bond. Since the adhesive used is RTV, vulcanizing obviously can be effected simply by letting the assembly stand at room temperature until it self-vulcanizes.

DESCRIPTION OF THE DRAWINGS

FIG. 1 is a fragmentary front elevational view of a cooking oven having gaskets connected thereto which are constructed in accordance with the invention of the copending application;

FIG. 2 is a fragmentary side elevational view of the oven of FIG. 1;

FIG. 3 is a fragmentary side elevational view of the gasket of the copending application, a portion being broken away to show the interior construction;

FIG. 4 is a fragmentary top plan view of the gasket of FIG. 3 with a portion broken away to show the interior construction;

FIG. 5 is an enlarged sectional view taken through the gasket of FIG. 3 along the line 5—5 and in the direction indicated;

FIG. 6 is a perspective view of an insert of the prior art; showing the type of perforation with which the same is used, FIG. 7 is a view similar to that of FIG. 6 but showing a modified form of the invention;

FIG. 8 is a view similar to that of FIGS. 6 and 7 but showing still another form of the gasket; and FIG. 9 is a simplified flow diagram showing one method of making the gaskets of the invention.

DESCRIPTION OF THE PREFERRED EMBODIMENTS

According to the copending application, a sealing structure is achieved by means of a plurality of gaskets which are removably secured around the opening of a cooking oven which is to be closed by an oven door. The door is swung into position over the opening, engaging the gaskets around the opening and compressing the same, thereby preventing the loss of heat from the oven or the transfer of cold air from the exterior of the oven into the cooking chamber.

The gaskets are each expansible, comprising lengths of elastomeric material having hooklike structures at their ends which engage in perforations provided in the front wall of the oven. Each length has an insert in its end in which the hooklike structures are formed, the inserts being held in the respective ends by a strong bond formed between the metal insert and the interior walls of the gasket. The bond is achieved by means of room temperature vulcanizable (RTV) adhesive.

In FIG. 1 there is illustrated the front of an oven 10, having a front framing wall 12 and provided with a cooking chamber that has an entrance or opening 14 defined by sides 16 and the top and bottom edges 18. The wall 12 frames the opening 14. There is a conventional door 20 (FIG. 2) hingedly connected at 22 to the oven 10 and suitably sprung (not shown) to enable its being swung over the opening 14 to confront the wall 12 or swing away from the opening 14 to give access to the cooking chamber. The exact construction of the door and its mechanism is of no consequence to the invention, except for the fact that the interior surface 24 of the door 20 is intended to engage upon the gaskets placed around the opening 14.

In FIGS. 1 and 2 gaskets 26 are shown engaged adjacent the sides 16 and adjacent the upper edge 18, these three sides of the opening 14 being the ones usually sealed. Each of the gaskets is constructed in the same manner, the upper gasket being somewhat longer than the other two. Each gasket 26 is easily installed or readily removable, for cleaning the surface of the oven 12 or for replacing the gaskets. The manner in which this is done and the construction of the gaskets will now be set forth.

The gasket 26 is comprised of an elongate rectangular cross section tubular member 28 of elastomeric material, such as for example silicone rubber or the like having a central hollow bore 30 and an exterior protruding flap 32. The flap 32 is intended to face outwardly when the gasket is installed so that it can be engaged by the door surface 24 and crushed or collapsed to form a tight seal. Any sealing configuration known in the gasket art could be used. The body of the gasket, that is the tubular member 28 may be an extruded form made by any well-known technique.

Each end of each gasket has a metal insert 34 engaged in the hollow bore 30, each insert being an elongate strip of metal having the integral hook 36 formed on one end. Securement of the insert 34 within the hollow bore 30 is accomplished by means of RTV adhesive 38 bonding the insert 34 in place.

One process of making the gasket 26 is described in connection with FIG. 9. The block 40 represents the first station to which the gasket 26 passes in the process of manufacturing the same. At the station 40 which is marked "dip," small containers of RTV adhesive are present. The operator dips the insert 34, plain end first into the container, holding the hooked end 36. The adhesive is permitted to cover the entire insert but for the hooked end 36. The next step is represented by the block 42, marked "insert." The operator inserts the now coated insert 34 into the ends of the elongate member 28 with the hooked parts 36 both facing in the same direction. The next step is represented by the block 44, marked "cure." In this step, the gaskets 26 are placed in an autoclave and there subjected to steam for a few hours, preferably about four. The RTV adhesive cures and bonds the inserts 34 to the interior walls of the tubular member 28 as shown in FIG. 5, forming the coating or connecting structure 38. It has been found that this bond is so strong that it is impossible to pull the insert 34 out of the ends of the gasket 26 without tearing the gasket. It is assumed that the inserts 34 will be cleaned, degreased, etc., before the dipping step is undertaken, and that the workman will exercise reasonable care in keeping the body portions clean while handling the same.

In use, perforations such as shown at 46 are provided in the wall 12, there being a pair of perforations for each side of the opening 14 which is to have a gasket connected thereto. Considering the upper gasket 26 in FIG. 1, the distance between perforations 46 is deliberately made slightly greater than the length of the gasket 26. To install the gasket, the assembler pulls the gasket endwise and hooks the hooked formation 36 into the respective perforations 46. This applies tension to the gasket and keeps it tightly engaged against the wall 12. When the housewife wishes to remove the gasket 26, she merely applies a stretching force on it and removes it from the perforations 46, cleans the wall 12 and the gasket 26 and reinserts it in the same manner in which it was originally installed.

RTV adhesive is well known and there are many formulations available on the market such as RTV silicone rubber adhesive/sealants marketed by General Electric, Silicone Products Department, Waterford, N.Y., and those adhesive/sealants marketed under the trademark SILASTIC by the Dow Corning Corporation of Midland, Mich. Almost any general adhesive of this type may be used. It is intended to be vulcanized at room temperature but the use of elevated temperatures under moist conditions enhances the bond and hence the curing step which was discussed above which includes subjecting the gasket 26 to steam for several hours. It is pointed out that the gasket 26 during its eventual use is subjected to the heat of the oven itself and this serves further to vulcanize the bond represented by the coating 38 so that the inserts 34 are permanently secured within the tubular members 28. Obviously, RTV will self-vulcanize if permitted to stand, without using elevated temperatures, autoclaves, etc.

In FIG. 6 there is illustrated the type of insert 50 which is disclosed in said U.S. Pat No. 3,404,675. The barbs 52 are shown formed along opposite edges of the insert and the end has an offset tab 54 which is intended to be engaged in a slot 56 that is perforated in the oven wall 12. The same type of tab 54 with its accompanying perforation 56 may be used in connection with the gasket 26 in place of the hook. It is preferred, however, to use the hooked portions. If the insert 50 is used together with the vulcanized RTV adhesive 38, such a structure will be highly effective to prevent withdrawal of the insert 50 from an elastomeric gasket. This is within the scope of the invention.

FIGS. 7 and 8 illustrate inserts 58 and 60 each of which has a series of passageways 62 and 64 respectively punched in the body thereof. These openings become filled with the RTV adhesive during the dipping process represented by the block 40 and hence when cured, there is provided a strong bond in the form of a dowel or connection comprised of cured elastomeric material passing through these passageways 62 and 64. When the RTV adhesive is cured, it is in effect substantially an elastomeric material, practically as solid as the elastomeric material from which the gaskets 26 are made.

The left-hand end of each of the inserts 58 and 60 is provided with a hooked formation similar to that identified above as 36. The hook formation 66 has the same width as the body of the insert 58 and it is intended to engage in a large perforation 46. The hooked formation 68 of the insert 60 is much smaller in width than the body of the insert 60 and is intended to be engaged in a much smaller perforation 46. It has been found that even this smaller size hook formation is sufficiently effective to hold the gasket in place and the resulting appearance is more pleasant. The hook formations 36 illustrated in FIGS. 1 to 4 are of this latter type.

Variations are capable of being made without departing from the spirit or scope of the invention as defined in the appended claims.

What it is desired to secure by Letters Patent of the United States is:

1. A method of making elastomeric gaskets which are to be used in sealing an oven door to an oven frame, each gasket comprising an elongate elastomeric gasket member having hollow ends and having a metal insert in each hollow end, each insert having a body portion and a securing formation at one end thereof and being assembled in the gasket with the body portion in a hollow end and the securing formation protruding from the gasket, said method comprising:
  a. forming an elongate elastomeric gasket with hollow ends,
  b. forming a metal insert with a body portion and a securing portion at one end thereof,
  c. coating the body portion of each insert excluding the securing formation with a room temperature vulcanizable adhesive in liquid form,
  d. inserting said body portion into the hollow ends of the elongate gasket member and
  e. curing the resulting assembly in moist heat for substantially more than an hour.

2. The method as claimed in claim 1 in which the coating is effected by dipping the body portion in a bath of liquid room temperature vulcanizable adhesive while the securing formation is being held and not permitted to enter said bath.

3. The method as claimed in claim 1 in which the curing is effected in a steam autoclave.

4. The method as claimed in claim 2 in which the curing is effected in a steam autoclave.

5. A method of making elastomeric gaskets which are to be used in sealing an oven door to an oven frame, each gasket comprising an elongate elastomeric gasket member having hollow ends and having a metal insert in each hollow end, each insert having a body portion and a securing formation at one end thereof and being assembled in the gasket with the body portion in a hollow end and the securing formation protruding from the gasket, said method comprising:
  a. forming a metal insert with an elongate body portion and a securing formation at one end thereof,
  b. forming an elongate length of elastomeric gasket with hollow ends,
  c. coating one of the interior of said hollow end and the exterior of a body portion of said insert with a room temperature vulcanizable adhesive in liquid form,
  d. inserting said body portion into said last-mentioned hollow end with said securing formation protruding from said hollow end, and
  e. curing the room temperature vulcanizable adhesive to a nonliquid substantially vulcanized condition.

6. The method as claimed in claim 5 in which the coating and inserting are repeated for the second end of the gasket.

7. The method as claimed in claim 6 in which the body portions are coated and the interior of the hollow ends are dry before insertion.

8. The method as claimed in claim 6 in which the curing is effected by subjecting the gasket to moist heat.

9. The method as claimed in claim 7 in which the body portions are coated by dipping same into a bath of room temperature vulcanizable adhesive.

* * * * *